United States Patent
Konda et al.

(10) Patent No.: US 11,128,438 B1
(45) Date of Patent: Sep. 21, 2021

(54) SYSTEMS, METHODS, AND MEDIA FOR SHARING IOT DEVICE PROFILE DATA

(71) Applicant: McAfee, LLC, Santa Clara, CA (US)

(72) Inventors: Tirumaleswar Reddy Konda, Bengaluru (IN); Harsha R. Joshi, Bengaluru (IN); Eric D. Wuehler, Beaverton, OR (US); Piyush P. Joshi, Aurangabad (IN)

(73) Assignee: McAfee, LLC, San Jose, CA (US)

( * ) Notice: Subject to any disclaimer, the term of this patent is extended or adjusted under 35 U.S.C. 154(b) by 325 days.

(21) Appl. No.: 16/113,739

(22) Filed: Aug. 27, 2018

(51) Int. Cl.
*H04L 9/00* (2006.01)
*H04L 9/06* (2006.01)
*H04L 29/06* (2006.01)

(52) U.S. Cl.
CPC ........ *H04L 9/0637* (2013.01); *H04L 63/0263* (2013.01); *H04L 63/102* (2013.01); *H04L 63/20* (2013.01)

(58) Field of Classification Search
CPC .................................................... H04L 9/0637
USPC ............................................................ 726/1
See application file for complete search history.

(56) References Cited

U.S. PATENT DOCUMENTS

| | | | | |
|---|---|---|---|---|
| 2019/0089747 A1* | 3/2019 | Wang | ................... | H04L 9/0841 |
| 2019/0109717 A1* | 4/2019 | Reddy | ................... | H04L 9/0643 |
| 2020/0042625 A1* | 2/2020 | Balaraman | ............ | G06F 16/258 |

OTHER PUBLICATIONS

WO 2018/125989; "The Internet of Things"; Smith; (Year: 2018).*
Apthorpe et al., "A Small Home is No Castle: Privacy Vulnerabilities of Encrypted IoT Traffic", in arXiv, May 18, 2017, pp. 1-6.
Castro et al., "Practical Byzantine Fault Tolerance,", in The Proceedings of the Third Symposium on Operating Systems Design and Implementation, New Orleans, LA, US, Feb. 1999, pp. 1-14.
Evans et al., "Public Key Pinning Extension for HTTP", in IETF, Apr. 2015, pp. 1-29.
Github.com, "Protocol Specification", Jun. 22, 2016, pp. 1-68, available at: https://github.com/hyperledger-archives/fabric/blob/master/docs/protocol-spec.md#211-membership-services.
Lear et al., "Manufacturer Usage Description Specification", in IETF Network Working Group, Jan. 25, 2018, pp. 1-60.
Leyden, J., "Samsung Smart Fridge Leaves Gmail Logins Open to Attack", in The Register, Aug. 24, 2015, pp. 1-3.
Pindrop Blog, "FTC Warns of Security and Privacy Risks in IoT Devices", Jan. 19, 2018. pp. 1-4, available at: https://www.pindrop.com/blog/ftc-warns-of-security-and-privacy-risks-in-iot-devices/.

(Continued)

*Primary Examiner* — Christopher J Brown
(74) *Attorney, Agent, or Firm* — Byrne Poh LLP

(57) ABSTRACT

Sharing IoT device (IoTd) profile data is provided, comprising: generating at least one access control rule to protect an IoTd; publishing first IoTd profile data in a first new block (FNB) of a blockchain of a blockchain network (BN), wherein the first IoTd profile data comprises the at least one access control rule; and committing the FNB to the blockchain based on a consensus algorithm by: a manufacturer of the IoTd committing the FNB to the blockchain; a security vendor (SV) participating in the BN committing the FNB to the blockchain when the SV is a sole SV participating in the BN; or the SV committing the FNB to the blockchain based on consensus among at least the SV and a plurality of security vendors when the SV and the plurality of security vendors are participating in the BN.

21 Claims, 7 Drawing Sheets

(56) References Cited

OTHER PUBLICATIONS

PolySwarm.io, "PolySwarm", Aug. 23, 2018, pp. 1-12, available at: https://polyswarm.io/.
Porup, J., "'Internet of Things' Secutiry is Hilariously Broken and Getting Worse", in Ars Technica, Jan. 23, 2016, pp. 1-4.

* cited by examiner

```
                                                          200

"acl-name": "sample-security-camera",
"acl-type": "ipv4-acl",
"access-list-entries": {
  "ace": [
    {
      "rule-name": "r1",
      "matches": {
        "ipv4-acl": {
          "dnsname":
            "nexus.sample.com",                    ⎫
            "oculus519-vir.sample.com",            ⎬  202
            "pool.smpl.org",                       ⎭
  204 ─── "protocol": tcp,
            "destination-port-range": {            ⎫  206
              "lower-port": 443,                   ⎬
              "upper-port": 443                    ⎭
            }
        },
        "tcp-acl": {
          "direction-initiated": "from-device"
        }
      },
      "actions": {
        "forwarding": "permit"
      }
    }
  ]
}
```

FIG. 2

SYSTEMS, METHODS, AND MEDIA FOR SHARING IOT DEVICE PROFILE DATA

TECHNICAL FIELD

The disclosed subject matter relates to systems, methods, and media for sharing Internet of Things (IoT) device profile data.

BACKGROUND

Internet of Things (IoT) devices are becoming increasingly prevalent in home, enterprise, and industrial deployments. For example, IoT devices include smart thermostats, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), a smart security system, and/or any other suitable device capable of connecting to a network to transmit and receive data. A major problem with the deployment of IoT devices is related to scale, security and privacy vulnerabilities, and expertise of end users. Many IoT devices are purchased off the shelf, and most IoT device manufacturers have not considered security and privacy in product design. For example, IoT devices are often sold with vulnerable embedded operating systems and software that do not use encryption or that use weak encryption mechanisms for communication. Furthermore, it is unlikely for an end user to be aware of security and privacy requirements or the level of security and privacy built into an IoT device, particularly for end users of home networks.

Accordingly, it is desirable to provide new systems, methods, and media for sharing IoT device information.

SUMMARY

Systems, methods, and media for sharing Internet of Things (IoT) device profile data are provided. In accordance with some embodiments of the disclosed subject matter, a system for sharing IoT device profile data is provided, the system comprising: a memory; and a hardware processor coupled to the memory that is configured to: generate at least one access control rule to protect an IoT device; publish first IoT device profile data in a first new block of a blockchain of a blockchain network, wherein the first IoT device profile data comprises the at least one access control rule; and commit the first new block to the blockchain based on a consensus algorithm by: a) a manufacturer of the IoT device committing the first new block to the blockchain; b) a security vendor participating in the blockchain network committing the first new block to the blockchain when the security vendor is a sole security vendor participating in the blockchain network; c) the security vendor committing the first new block to the blockchain based on consensus among at least the security vendor and a plurality of security vendors when the security vendor and the plurality of security vendors are participating in the blockchain network; d) the security vendor committing the first new block to the blockchain based on consensus among at least the security vendor and one or more internet service providers (ISP) managing the IoT device when the security vendor and the one or more ISPs are participating in the blockchain network; e) the security vendor committing the first new block to the blockchain based on consensus among at least the security vendor and the manufacturer of the IoT device when the security vendor and the manufacturer of the IoT device are participating in the blockchain network; or f) an ISP participating in the blockchain network committing the first new block to the blockchain based on consensus among at least the ISP and the one or more ISPs managing the IoT device when the ISP and the one or more ISPs are participating in the blockchain network.

In accordance with some embodiments of the disclosed subject matter, a method for sharing IoT device profile data is provided, the method comprising: generating at least one access control rule to protect an IoT device; publishing first IoT device profile data in a first new block of a blockchain of a blockchain network, wherein the first IoT device profile data comprises the at least one access control rule; and committing the first new block to the blockchain based on a consensus algorithm by: a) a manufacturer of the IoT device committing the first new block to the blockchain; b) a security vendor participating in the blockchain network committing the first new block to the blockchain when the security vendor is a sole security vendor participating in the blockchain network; c) the security vendor committing the first new block to the blockchain based on consensus among at least the security vendor and a plurality of security vendors when the security vendor and the plurality of security vendors are participating in the blockchain network; d) the security vendor committing the first new block to the blockchain based on consensus among at least the security vendor and one or more internet service providers (ISP) managing the IoT device when the security vendor and the one or more ISPs are participating in the blockchain network; e) the security vendor committing the first new block to the blockchain based on consensus among at least the security vendor and the manufacturer of the IoT device when the security vendor and the manufacturer of the IoT device are participating in the blockchain network; or f) an ISP participating in the blockchain network committing the first new block to the blockchain based on consensus among at least the ISP and the one or more ISPs managing the IoT device when the ISP and the one or more ISPs are participating in the blockchain network.

In accordance with some embodiments of the disclosed subject matter, a non-transitory computer-readable medium containing computer-executable instructions that, when executed by a processor, cause the processor to perform a method for sharing IoT device profile data is provided, the method comprising: generating at least one access control rule to protect an IoT device; publishing first IoT device profile data in a first new block of a blockchain of a blockchain network, wherein the first IoT device profile data comprises the at least one access control rule; and committing the first new block to the blockchain based on a consensus algorithm by: a) a manufacturer of the IoT device committing the first new block to the blockchain; b) a security vendor participating in the blockchain network committing the first new block to the blockchain when the security vendor is a sole security vendor participating in the blockchain network; c) the security vendor committing the first new block to the blockchain based on consensus among at least the security vendor and a plurality of security vendors when the security vendor and the plurality of security vendors are participating in the blockchain network; d) the security vendor committing the first new block to the blockchain based on consensus among at least the security vendor and one or more internet service providers (ISP) managing the IoT device when the security vendor and the one or more ISPs are participating in the blockchain network; e) the security vendor committing the first new block to the blockchain based on consensus among at least the security vendor and the manufacturer of the IoT device when the security vendor and the manufacturer of the IoT device are participating in the blockchain network; or f) an ISP participating in the blockchain network committing the first new block to the blockchain based on consensus among at least the ISP and the one or more ISPs managing the IoT device when the ISP and the one or more ISPs are participating in the blockchain network.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows an example of an access control rule for protecting an IoT device in accordance with some embodiments of the disclosed subject matter.

DETAILED DESCRIPTION

Figure 1:
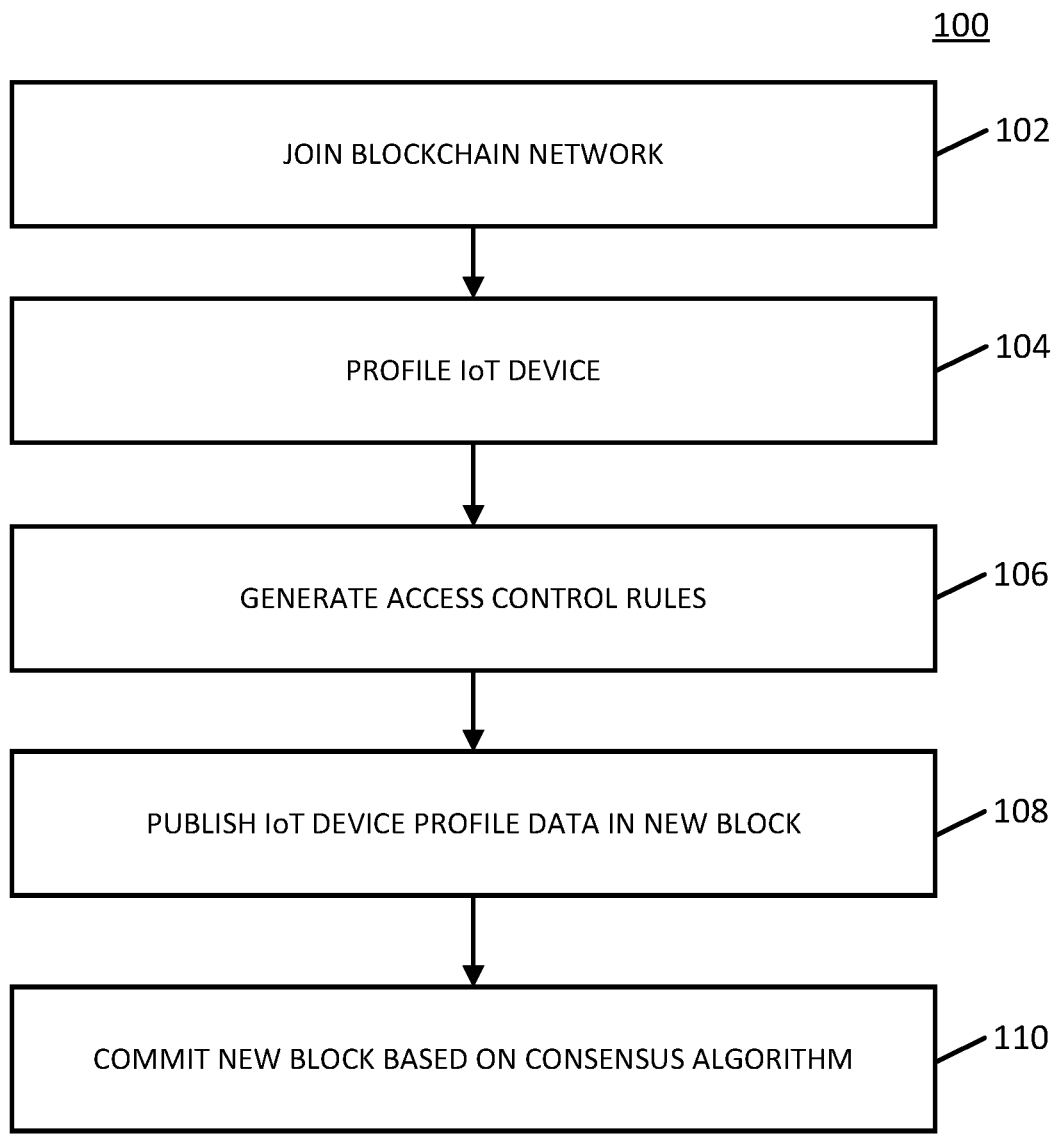
FIG. 1 shows an example of a process for sharing Internet of Things (IoT) device profile data in a blockchain network in accordance with some embodiments of the disclosed subject matter.

In accordance with various embodiments, mechanisms (which can include systems, methods, and media) for sharing Internet of Things (IoT) device profile data are provided. In some embodiments, the mechanisms described herein can be used to provide a blockchain-based, decentralized mechanism to identify and potentially address security and privacy vulnerabilities on IoT devices.

In some embodiments, the mechanisms described herein can be used to share IoT device profile data. For example, in some embodiments, the IoT device profile data can include device information (e.g., type, category, make, model, firmware version, and/or any suitable information for identifying a device), firewall rules (e.g., L3/L4 firewall rules, Transport Layer Security (TLS) firewall rules, and/or any other suitable firewall rules), privacy rules (e.g., prevent passive monitoring, establish secure communication tunnel, and/or any other suitable privacy rules), and/or any other suitable information and/or rules, as described below in connection with FIG. 2. Note that, in some embodiments, IoT devices can include any suitable type of IoT devices, such as smart thermostats, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), a smart security system, and/or any other suitable device capable of connecting to a network to transmit and receive data.

In some embodiments, mechanisms described herein can be used to share IoT device profile data in a blockchain network. For example, in some embodiments, the mechanisms described herein can profile an IoT device and publish IoT device profile data corresponding to the IoT device as one or more blocks in a blockchain, as described below in connection with FIG. 1. In some embodiments, the mechanisms described herein can be used to join the blockchain network, and published IoT device profile data can be available to each participant of the blockchain network, as described in connection with FIG. 1. For example, in some embodiments, a participant can be a security vendor offering services to protect IoT devices, an internet service provider (ISP) managing home networks, an IoT device manufacturer, an administrator of a protected network, and/or any other suitable participant. In some embodiments, the mechanisms described herein can be used to commit the block(s) according to a consensus algorithm, as described below in connection with FIG. 1.

In some embodiments, the mechanisms described herein can be used to enforce shared IoT device profile data. For example, in some embodiments, the mechanisms described herein can be used to retrieve IoT device profile data related to one or more discovered IoT devices, as described below in connection with FIGS. 3 and 4. As a more particular example, the mechanisms described herein can be used to retrieve one or more blocks and/or IoT device profile data related to a discovered IoT device, and can further be used to enforce appropriate policies contained therein to protect the discovered device(s), as described below in connection with FIGS. 3 and 4.

In some embodiments, the mechanisms described herein can be used to update one or more access control rules for an IoT device. For example, in some embodiments, the mechanisms described herein can be used submit a request to update an access control rule including a claim to reject the access control rule as a "false positive," and/or to identify an additional access control rule to be enforced, as described below in connection with FIG. 5. As another example, in some embodiments, the mechanisms described herein can be used to validate the request by confirming a claim that an access control rule is a "false positive" and/or that an additional access control rule needs to be enforced, such as by consensus among participants of the blockchain network in some embodiments, as described below in connection with FIG. 5. Additionally, in some embodiments, the mechanisms described herein can be used to append a new block to the blockchain if there is consensus among participants of the blockchain network that the claim is correct, as described below in connection with FIG. 5.

In some embodiments, the mechanisms described herein can be used to improve computer security by automatically sharing and enforcing dynamic IoT device-specific access control rules. For example, the mechanisms described herein reduce the threat surface of IoT devices at consumer premises by making appropriate and up-to-date access control rules available to all participants of a blockchain network for enforcement, such as by security vendors in some embodiments. As another example, the mechanisms described herein can ensure accurate and granular IoT device profile data is built through consensus among semi-trusted participants of a blockchain network.

Turning to FIG. 1, an example 100 of a process for sharing IoT device profile data in a blockchain network in accordance with some embodiments of the disclosed subject matter is shown. As illustrated, blocks of process 100 can be executed by one or more nodes of a blockchain network. Note that, in some embodiments, a node as described herein can be implemented by one or more suitable computing devices, such as one or more servers, one or more user devices, one or more routers, and/or any other suitable computing device(s), as shown in and described below in connection with FIGS. 6 and 7.

At 102, a node can join a blockchain network. In some embodiments, a node can be controlled by any suitable entity, such as an individual, a business, an organization, an authorized employee of an organization, and/or any other suitable entity. In some embodiments, a blockchain network can be a permissioned blockchain network, where only permissioned participants can join the blockchain network. In some embodiments, a node can be controlled by a permissioned participant of a blockchain network. For example, in some embodiments, a permissioned participant of a blockchain network can be a security vendor, an ISP, an IoT device manufacturer, an administrator of a protected network, and/or any other suitable participant.

At 104, a node can determine profiling information related to an IoT device. Note that, in some embodiments, IoT devices can include any suitable type of IoT devices, such as smart thermostats, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), a smart security system, and/or any other suitable device capable of connecting to a network to transmit and receive data. In some embodiments, profiling information related to an IoT device can include any suitable data or content. For example, in some embodiments, profiling information related to an IoT device can include fully qualified domain names, destination IP addresses, destination port numbers, protocols, a maximum number of connections an IoT device makes, incoming connections, and/or server certificate information. Additionally, note that in some embodiments, profiling information related to an IoT device can include any other suitable information, such as IoT device type, IoT device category, make and/or model of an IoT device, and/or firmware version of an IoT device.

In some embodiments, a node can determine profiling information in any suitable manner. For example, in some embodiments, a node can include and/or be in communication with a device discovery and categorization engine, a known vulnerabilities database, and/or an anomaly detection service to determine profiling information. Additionally or alternatively, in some embodiments, a node can collect network flow records (e.g., NetFlow) to determine profiling information.

At 106, a node can generate one or more access control rules to protect an IoT device. In some embodiments, an access control rule for an IoT device can include any suitable data or content. In some embodiments, an access control rule can include an L3/L4 firewall rule, a TLS firewall rule, a privacy rule, and/or any other suitable rule. For example, in some embodiments, an L3/L4 firewall rule can specify: fully qualified domain names an IoT device can contact, destination IP addresses an IoT device can contact, permitted destination port numbers for traffic, allowed protocols (e.g., HTTPS, DNS, CoAP, etc.), a maximum number of connections an IoT device can make, whether incoming connections are allowed or blocked, whether control of the IoT device communication with other devices in a network (e.g., east-west traffic) is allowed or blocked, an allowed maximum bitrate of traffic exchanged with an IoT device, and/or any other suitable L3/L4 firewall rule. In some embodiments, a TLS firewall rule can specify whether an IoT device is allowed or blocked from reaching servers using self-signed certificates. For example, in some embodiments, a TLS firewall rule can specify: an IoT device is only permitted to communicate with servers having pinned self-signed certificates (e.g., by using Subject Public Key Information (SPKI) fingerprint), certificate authorities that provide certificates for server domains must be listed in a TLS firewall rule, and/or any other suitable TLS firewall rule. In some embodiments, a privacy rule can specify that a secure tunnel (e.g., IPsec) must be established between a home router and a cloud server to obfuscate and encrypt IoT device traffic and/or any other suitable privacy rule.

In some embodiments, a node can generate one or more access rules in any suitable manner. In some embodiments, a node can generate one or more access rules based on profiling information. For example, in some embodiments, a node can analyze profiling information to determine a valid domain(s), port(s), and/or protocol(s) to which a given IoT device connects. Then, in some embodiments, a node can create one or more access control rules to permit a given IoT device to communicate on a valid domain(s), port(s), and/or protocol(s), for instance.

For example, turning to FIG. 2, an example 200 of an access control rule to protect an IoT device in accordance with some embodiments of the disclosed subject matter is shown. The access control rule 200 can include fully qualified domain names 202 the IoT device is allowed to contact, allowed protocols 204, and/or allowed destination ports 206.

Turning back to FIG. 1, at 108, a node can publish IoT device profile data. In some embodiments, IoT device profile data can include any suitable data or content. In some embodiments, IoT device profile data can include device information, such as device type, device category, make and/or model of an IoT device, firmware version of an IoT device, and/or any other suitable information to identify an IoT device. Additionally, in some embodiments, the IoT device profile data can include one or more access control rules, such as L3/L4 firewall rules, TLS firewall rules, privacy rules, and/or any other suitable rule to protect an IoT device. Note that in some embodiments, IoT device profile data can additionally or alternatively include any other suitable information.

In some embodiments, a node can publish IoT device profile data in any suitable manner. In some embodiments, the published IoT profile data can be shared with each node in a blockchain network. In some embodiments, a node can publish IoT device profile data in a new block of a blockchain. For example, in some embodiments, a node can either profile IoT device profile data for a new IoT device or profile additional IoT device profile of an existing IoT device. In some embodiments, in instances where a node profiles IoT device profile for a new IoT device, a node can publish IoT device profile data in a root block of a blockchain. In some embodiments, in instances where a node profiles additional IoT device profile data for an existing IoT device, a node can publish IoT device profile data in a new block that is linked to a previously committed block for an existing IoT device. In some embodiments, a new block in a blockchain can be in a "PENDING" state until its validity can be confirmed based on a consensus algorithm. In some embodiments, a node can sign IoT device profile data using a private key corresponding to a participant controlling the node to provide data origin authentication.

In some embodiments, a blockchain network can include one or more validating nodes. Additionally or alternatively, in some embodiments, a blockchain network can include one or more non-validating nodes. For example, in some embodiments, a validating node can be a node that confirms validity of published IoT device profile data based on a consensus algorithm. In some embodiments, a validating node can be controlled by a security vendor, an ISP, an IoT device manufacturer, or any other suitable participant of a blockchain network. In some embodiments, a node can have revocable authorization to act as a validating node. For example, in some embodiments, a validating node that is an outlier can be penalized by revoking its authorization to act as a validating node. In some embodiments, a non-validating node can be a node that is controlled by an administrator of a protected network or any other suitable participant of a blockchain network.

At 110, a node can commit a new block to a blockchain based on any suitable consensus algorithm. For example, in some embodiments, a node controlled by an IoT device manufacturer can have full authority to commit a new block of published IoT device profile data for an IoT device that it manufactures without consensus of other validating nodes. In some embodiments, a node controlled by a security vendor can commit a new block of IoT device profile data for a profiled IoT device without consensus of other validating nodes if the security vendor is the only security vendor participating in the blockchain network, the IoT device profiled by the security vendor is not managed by an ISP, and the manufacturer of the profiled IoT device is not participating in the blockchain network.

In some embodiments, a Practical *Byzantine* Fault Tolerance (PBFT) protocol can be used to confirm validity of published IoT device profile data. In some embodiments, in instances where a PBFT protocol is used as a consensus algorithm, then, in a blockchain network of N validating nodes, a minimum of 2f+1 validating nodes can reach a consensus to commit a block, where f=(N−1)/3. Using a PBFT protocol, a blockchain network can withstand f *Byzantine* (i.e., faulty and/or non-agreeing) validating nodes. For example, in some embodiments, if a PBFT protocol is used to reach a consensus and commit new blocks of published IoT device profile data, then at least four validating nodes (N=4) can participate in the PBFT protocol to reach a consensus to commit a new block. As a more particular example, in some embodiments, a PBFT protocol can be used by at least four security vendors (N=4) to reach a consensus and commit new blocks for profiled IoT devices not managed by any ISP, where the manufacturers for the profiled IoT devices are not participating in the blockchain network. In both examples, the blockchain network can withstand one *Byzantine* validating node (f=1). In other words, in both examples, at least three out of four validating nodes (2f+1) can reach a consensus to commit a block while at most one validating node is faulty and/or non-agreeing.

In some embodiments, if an IoT device is profiled by a node controlled by a security vendor and the profiled IoT device is either managed by one or more ISPs or manufactured by an IoT manufacturer that is participating in the blockchain network, then a new block for the profiled IoT device can be committed by consensus between the security vendor and the IoT manufacturer or by consensus between the security vendor and the ISPs. In some embodiments, if an IoT device is only profiled by ISPs, and a manufacturer of the profiled IoT device is not participating in the blockchain network, then a new block for the profiled IoT device can be committed by consensus among the ISPs.

In some embodiments, a node can commit a block to a blockchain in any suitable manner. In some embodiments, a block that has been committed can be removed from a "PENDING" state. In some embodiments, a block that has been committed can be linked to a new block that can be created.

Figure 3:
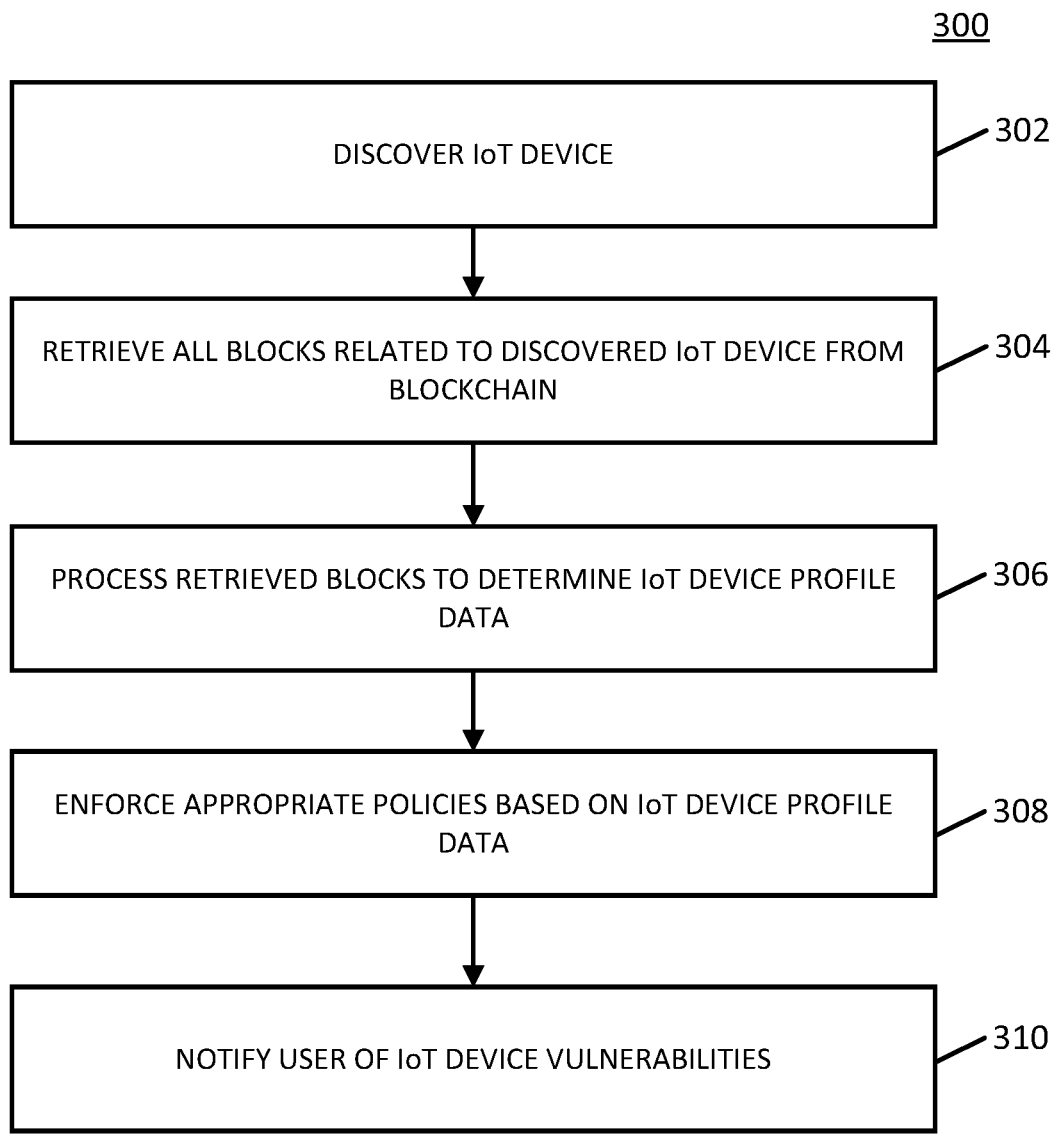
FIG. 3 shows an example of a process for enforcing IoT device profile data in accordance with some embodiments of the disclosed subject matter.

Turning to FIG. 3, an example of a process for enforcing IoT device profile data in accordance with some embodiments of the disclosed subject matter is shown. As illustrated, blocks of process 300 can be executed by one or more nodes participating in a blockchain network. For example, in some embodiments, blocks of process 300 can be executed by one or more non-validating nodes participating in a blockchain network. Note that, in some embodiments, a node as described herein can be implemented by one or more suitable computing devices, such as one or more servers, one or more user devices, one or more routers, and/or any other suitable type of computing device, as shown in and described below in connection with FIGS. 6 and 7. As a more particular example, in some embodiments, blocks of process 300 can be executed by one or more routers through which one or more IoT devices connect to a network.

At 302, a node can discover one or more IoT devices connected thereto. In some embodiments, a node can discover one or more connected IoT devices in any suitable manner.

At 304, a node can retrieve all blocks related to one or more discovered IoT devices from a blockchain. In some embodiments, one or more blocks related to a discovered IoT device can include IoT device profile data for the discovered IoT device. In some embodiments, a node can retrieve relevant blocks from a blockchain in any suitable manner.

At 306, a node can process retrieved blocks to determine IoT device profile data of the discovered IoT device(s). For example, in some embodiments, a node can process retrieved blocks to determine one or more access control rules for one or more discovered IoT device(s) from IoT device profile data. In some embodiments, a node can process retrieved blocks in any other suitable manner.

At 308, a node can enforce appropriate policies based on IoT device profile data of the discovered device(s). In some embodiments, an appropriate policy can be one or more access control rules specific to a discovered device based on IoT device profile data. For example, in some embodiments, a node can enforce one or more access rules to permit a discovered IoT device to communicate only on a valid domain(s), port(s), protocol(s), and/or any other suitable mechanism(s). In another example, in some embodiments, a node can enforce one or more access control rule to prevent a discovered IoT device from communicating on any means other than a valid domain(s), port(s), protocol(s), and/or any other suitable mechanism(s). In some embodiments, a node can enforce any other suitable access control rule based on IoT device profile data.

At 310, a node can notify a user of one or more vulnerabilities of a discovered IoT device based on IoT device profile data. For example, in some embodiments, a vulnerability of a discovered IoT device can include a security vulnerability, a privacy vulnerability, a software vulnerability, and/or any other suitable vulnerability of a discovered IoT device. Note that, in some embodiments, a user can be an administrator of a protected network, an owner of a router associated with a protected network, an administrator of a security service, and/or any other suitable user. In some embodiments, a node can notify a user in any suitable manner. For example, in some embodiments, a node can alert a user of an unauthorized attempt to communicate with an IoT device based on one or more access control rules.

Figure 4:
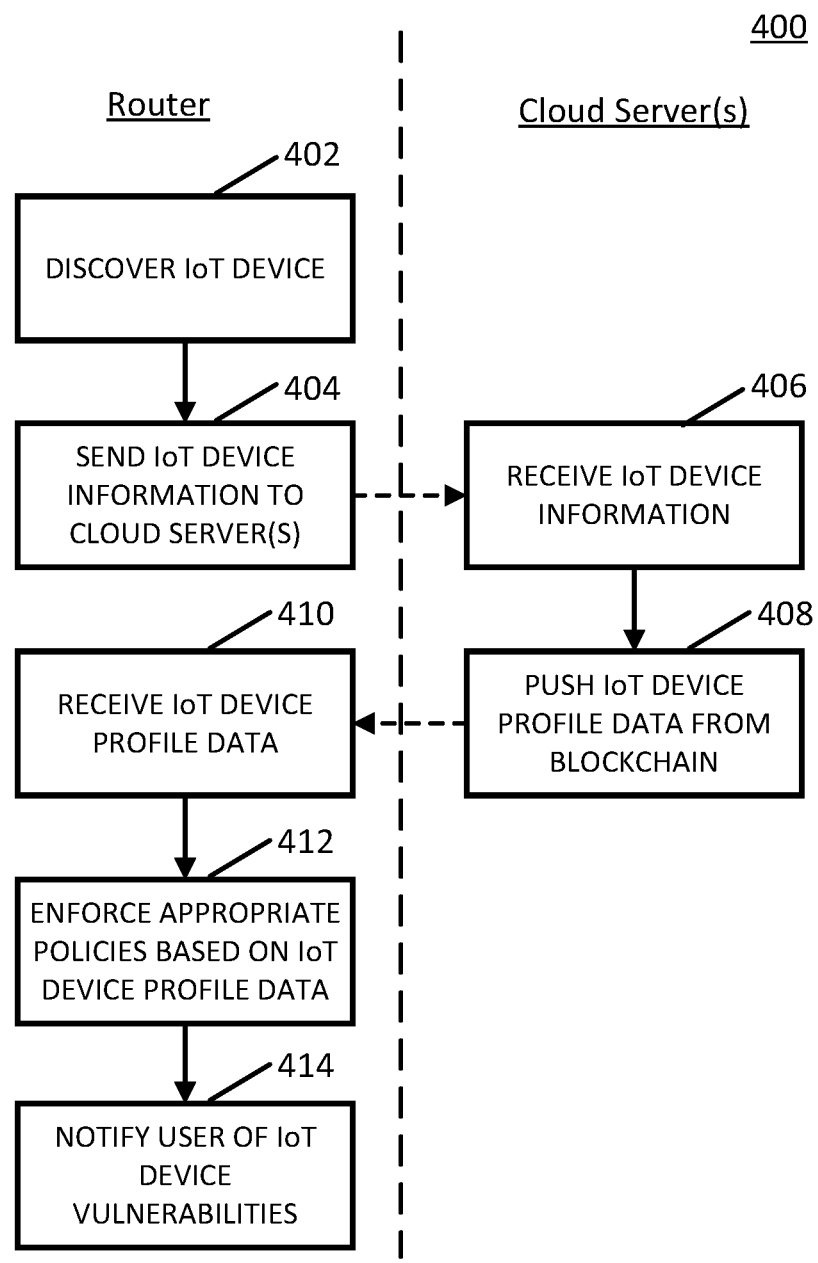
FIG. 4 shows an example of an information flow diagram for enforcing IoT device profile data in accordance with some embodiments of the disclosed subject matter.
Figure 6:
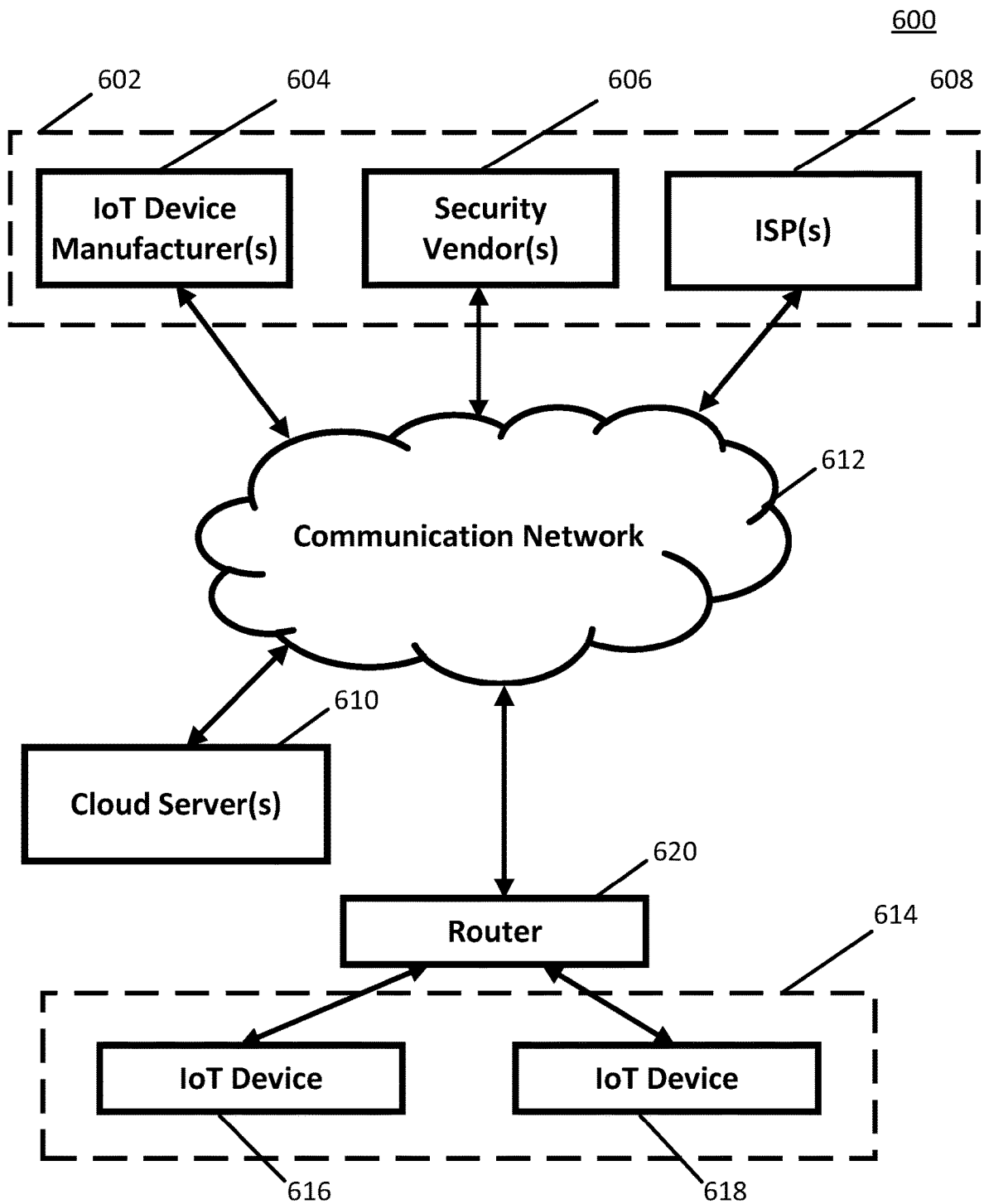
FIG. 6 shows a schematic diagram of an illustrative system suitable for implementation of mechanisms described herein for sharing IoT device profile data in accordance with some embodiments of the disclosed subject matter.
Figure 7:
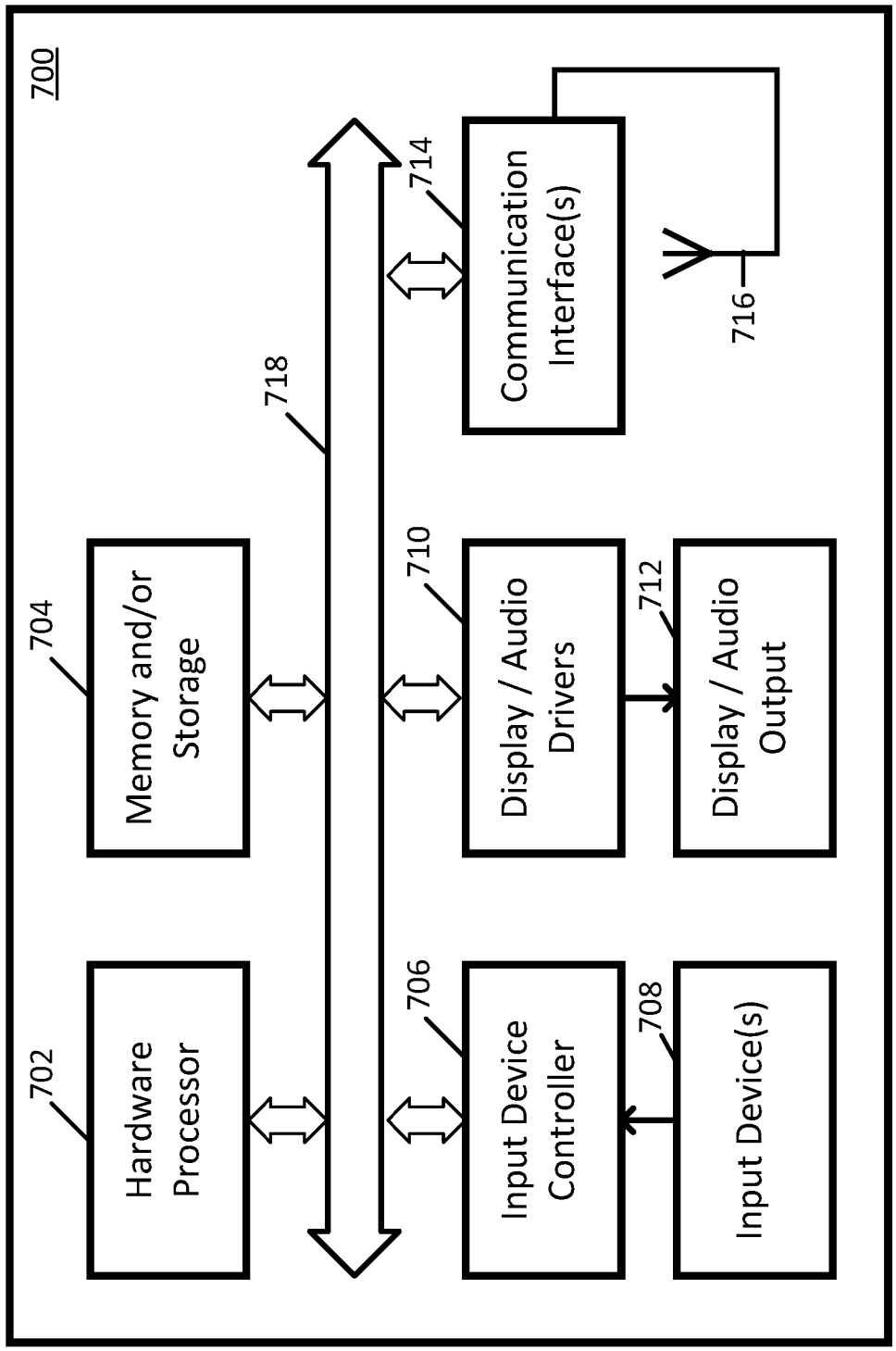
FIG. 7 shows a detailed example of hardware that can be used in a server and/or a user device of FIG. 6 in accordance with some embodiments of the disclosed subject matter.

Turning to FIG. 4, an example 400 of an information flow diagram for enforcing IoT device profile data in accordance with some embodiments of the disclosed subject matter is shown. As illustrated, blocks of process 400 can be executed by one or more routers through which one or more IoT devices connect to a network and one or more nodes, such as a cloud server, of a blockchain network. For example, in some embodiments, blocks of process 400 can be executed by one or more routers through which one or more IoT devices connect to a network and one or more cloud servers participating in a blockchain network, as illustrated in FIGS. 6 and 7.

Note that, in some embodiments, a router can be associated with any suitable security service. For example, in some embodiments, the router can be associated with a security service provided by a security vendor, by an ISP used by the router, and/or by any suitable business or organization that provides security services. In some embodiments, the security service can provide any suitable services, such as sharing dynamic IoT device-specific access control rules with the router. For example, in some embodiments, the security service can share dynamic IoT device-specific information by sharing IoT device profile data. In some embodiments, the security service can perform functions described herein as performed by the one or more cloud servers. In some embodiments, a cloud server can be either a validating node or a non-validating node in a blockchain network.

At 402, a router can discover one or more IoT devices connected thereto. In some embodiments, a router can discover one or more connected IoT devices in any suitable manner.

At 404, a router can send IoT device information related to one or more discovered IoT devices to one or more cloud servers participating in a blockchain network. In some embodiments, IoT device information can include any suitable content or data. For example, in some embodiments, IoT device information can include IoT device type, IoT device category, make and/or model of an IoT device, firmware version of an IoT device, and/or any other suitable information to identify an IoT device. In some embodiments, a router can send IoT device information to one or more cloud servers in any suitable manner.

At 406, a cloud server can receive IoT device information from a router in any suitable manner.

At 408, a cloud server can push IoT device profile data to the router. In some embodiments, a cloud server can retrieve all blocks related to a discovered IoT device(s) from a blockchain based on received IoT device information, process retrieved blocks to determine IoT device profile data for the discovered device(s), and transmit the IoT device profile data to the router. Additionally or alternatively, in some embodiments, a cloud server can retrieve relevant IoT device profile data from a database based on received IoT device information, and transmit the IoT device profile data. In some embodiments, a cloud server can push IoT device profile data to the router in any other suitable manner.

At 410, a router can receive IoT device profile data from a cloud server(s) in any suitable manner.

At 412, a router can enforce appropriate policies based on IoT device profile data of the discovered device(s). In some embodiments, an appropriate policy can include one or more access control rules specific to a discovered device based on IoT device profile data. For example, in some embodiments, a router can enforce one or more access rules to permit a discovered IoT device to communicate only on a valid domain(s), port(s), protocol(s), and/or any other suitable mechanism(s). In another example, in some embodiments, a router can enforce one or more access control rule to prevent a discovered IoT device from communicating on any means other than valid domain(s), port(s), protocol(s), and/or any other suitable mechanism(s). In some embodiments, a router can enforce any other suitable access control rule based on IoT device profile data.

At 414, a router can notify a user of one or more vulnerabilities of a discovered IoT device based on IoT device profile data. For example, in some embodiments, a vulnerability of a discovered IoT device can include a security vulnerability, a privacy vulnerability, a software vulnerability, and/or any other suitable vulnerability of a discovered IoT device. Note that, in some embodiments, a user can be an administrator of the router, an owner of the router, an administrator of a security service, an administrator of a network to which the router is connected, and/or any other suitable user. In some embodiments, a router can notify a user in any suitable manner. For example, in some embodiments, a router can alert a user of an unauthorized attempt to communicate with an IoT device based on one or more access control rules.

Figure 5:
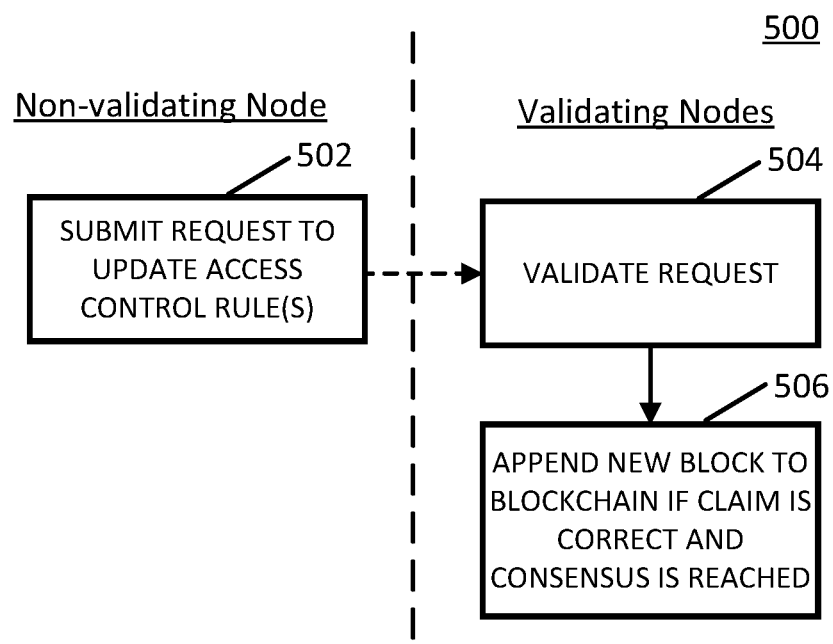
FIG. 5 shows an example of an information flow diagram for updating one or more access control rules for an IoT device in accordance with some embodiments of the disclosed subject matter.

Turning to FIG. 5, an example 500 of a process for updating one or more access control rules for an IoT device in accordance with some embodiments of the disclosed subject matter is shown. As illustrated, blocks of process 500 can be executed by one or more nodes of a blockchain network. Note that, in some embodiments, a node as described herein can be implemented by one or more suitable computing devices, such as one or more servers, one or more user devices, one or more routers, and/or any other suitable type of computing device, as shown in and described below in connection with FIGS. 6 and 7.

At 502, a non-validating node can submit a request to update one or more access control rules for an IoT device. For example, in some embodiments, a user associated with a router (e.g., an administrator of a network associated with the router, an owner of the router, and/or any suitable user) can determine that one or more access control rules associated with published IoT device profile data for an IoT device need to be updated and can transmit a request to one or more validating nodes. In some embodiments, the request can include a claim to reject one or more access control rules associated with published IoT device data for an IoT device as invalid, or as "false positives." Additionally or alternatively, in some embodiments, the request can include a claim that one or more additional access control rules need to be enforced for an IoT device. In some embodiments, a non-validating node can submit the request to update the one or more access control rules in any suitable manner.

At 504, one or more validating nodes can validate a request to update one or more access control rules. For example, in some embodiments, one or more security vendors, ISPs, and/or IoT device manufacturers can determine whether the claim is correct in any suitable manner. Additionally, in some embodiments, one or more security vendors, ISPs, and/or IoT device manufacturers can reach a consensus as to whether the claim is correct in any suitable manner.

At 506, a validating node can append a new block to a blockchain if consensus is reached that the claim is correct.

For example, in some embodiments, a validating node can publish updated IoT profile data including one or more updated access control rules in a new block that is linked to a block containing the previous access control rule(s). In some embodiments, a validating node can commit a new block appended to a blockchain in any suitable manner.

Turning to FIG. 6, an example 600 of hardware for sharing IoT device profile data that can be used in accordance with some embodiments of the disclosed subject matter is shown. As illustrated, hardware 600 can include one or more nodes 602, such as node 604, node 606, and node 608, one or more cloud server(s) 610, a communication network 612, one or more IoT devices 614, such as IoT devices 616 and 618, and/or a router 620. Note that, in some embodiments, node(s) 602, cloud server(s) 610, and/or router 620 can participate in a blockchain network.

Node(s) 602 can be any suitable computing device(s) for sharing IoT device profile data, such as one or more servers, one or more user devices, and/or any other suitable computing device(s). In some embodiments, node(s) 602 can be controlled by one or more suitable entities (e.g., one or more security vendors, one or more ISPs, and/or one or more IoT device manufacturers, etc.). In some embodiments, node(s) 602 can participate in a blockchain network. For example, in some embodiments, node(s) 602 can be a validating node in the blockchain network. In some embodiments, node(s) 602 can perform any suitable function(s), such sharing IoT device profile data and/or validating a request to update an access control rule, as described above in connection with FIGS. 1 and 5.

Cloud server(s) 610 can be any suitable server(s) for storing information, data, programs, and/or any other suitable type of content for sharing IoT device profile data. For example, in some embodiments, cloud server(s) 610 can be associated with a security service and can provide any suitable services, such as sharing dynamic IoT device-specific access control rules with router 620. In some embodiments, cloud server(s) 610 can participate in a blockchain network. For example, in some embodiments, cloud server(s) 610 be either a validating node or a non-validating node in a blockchain network. In some embodiments, cloud server(s) 610 can store one or more access control rules related to IoT devices 612. In some embodiments, cloud server(s) 610 can perform any suitable function(s), such sharing IoT device profile data, submitting a request to update an access control rule, and/or validating a request to update an access control rule, as described above in connection with FIGS. 1, 4, and 5.

Communication network 612 can be any suitable combination of one or more wired and/or wireless networks in some embodiments. For example, communication network 612 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, IoT devices 614 can be connected by one or more communications links to communication network 612 via router 620. In some embodiments, communication network 612 can be linked via one or more communications links to node(s) 602 and/or cloud server(s) 610. The communications links can be any communications links suitable for communicating data among IoT device(s) 614, router 620, node(s) 602, and cloud server(s) 610 such as network links, dial-up links, wireless links, hard-wired links, any other suitable communications links, or any suitable combination of such links.

Router 620 can be any suitable computing device(s) for sharing and/or enforcing IoT device profile data. In some embodiments, router 620 can be associated with any suitable security service (e.g., a security service provided by a security vendor, by an ISP used by the router, and/or by any suitable business or organization that provides security services). In some embodiments, router 620 can participate in a blockchain network. For example, in some embodiments, router 620 can be a non-validating node in the blockchain network. In some embodiments, router 620 can communicate with cloud server(s) 610 in lieu of participating in a blockchain network. In some embodiments, router 620 can store one or more access control rules related to IoT devices 614. In some embodiments, router 620 can perform any suitable function(s), such sharing IoT device profile data, enforcing IoT device profile data, and/or submitting a request to update an access control rule, as described above in connection with FIGS. 1 and 3-5.

IoT devices 614 can include any one or more IoT devices. For example, in some embodiments, IoT devices 614 can include devices such as smart appliances (e.g., smart thermostats, smart kitchen appliances, and/or any other suitable type of smart appliances), smart media devices (e.g., speakers, televisions, and/or any other suitable type of media playback devices), and/or any other suitable type of IoT devices.

Although nodes 604, 606, and 608 and cloud server(s) 610 are each illustrated as one device, the functions performed by nodes 604, 606, and 608 and cloud server(s) 610 can be performed using any suitable number of devices in some embodiments. For example, in some embodiments, multiple devices can be used to implement the functions performed by each node 604, 606, and 608 and cloud server(s) 610.

Although two IoT devices 614 and 616 are shown in FIG. 6 to avoid over-complicating the figure, any suitable number of IoT devices, and/or any suitable types of IoT devices, can be used in some embodiments.

Server(s) 602, server(s) 610, and IoT devices 614 can be implemented using any suitable hardware in some embodiments. For example, in some embodiments, devices 602, 610, and 614 can be implemented using any suitable general-purpose computer or special-purpose computer. For example, a smart appliance may be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 702 can be controlled by a server program stored in memory and/or storage of a server, such as cloud server 610. For example, in some embodiments, the server program can cause hardware processor 702 to share IoT device profile data, submit a request to update an access control rule, validate a request to update an access control rule, and/or perform any other suitable functions. In some embodiments, hardware processor 702 can be controlled by a program stored in memory and/or storage of a router, such as router 620. For example, in some embodiments, the program can cause hardware processor 702 to share IoT device profile data, implement IoT device profile data, submit a request to update an access control rule, and/or perform any other suitable functions.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., computer network 612). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 612) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

In some embodiments, at least some of the above described blocks of the processes of FIGS. 1 and 3-5 can be executed or performed in any order or sequence not limited to the order and sequence shown in and described in connection with the figures. Also, some of the above blocks of FIGS. 1 and 3-5 can be executed or performed substantially simultaneously where appropriate or in parallel to reduce latency and processing times. Additionally or alternatively, some of the above described blocks of the processes of FIGS. 1 and 3-5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems, methods, and media for sharing IoT device profile data are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for sharing Internet of Things (IoT) device profile data, the system comprising:
 a memory; and
 a hardware processor coupled to the memory that is configured to:
  generate at least one access control rule to protect an IoT device;
  publish first IoT device profile data in a first new block of a blockchain of a blockchain network, wherein the first IoT device profile data comprises the at least one access control rule; and
  commit the first new block to the blockchain based on a consensus algorithm by:
   the security vendor committing the first new block to the blockchain based on consensus among at least the security vendor and one or more internet service providers (ISP) managing the IoT device when the security vendor and the one or more ISPs are participating in the blockchain network;
   an ISP participating in the blockchain network committing the first new block to the blockchain based on consensus among at least the ISP and the one or more ISPs managing the IoT device when the ISP and the one or more ISPs are participating in the blockchain network.

2. The system of claim 1, wherein the at least one access control rule comprises an L3/L4 firewall rule, a Transport Layer Security firewall rule, or a privacy rule.

3. The system of claim 1, wherein the hardware processor is further configured to:
 sign the first IoT device profile data using a private key while having revocable authorization to act as a validating node.

4. The system of claim 1, wherein the consensus algorithm comprises using a Practical *Byzantine* Fault Tolerance protocol among at least four validating nodes of the blockchain network to reach consensus.

5. The system of claim 1, wherein the hardware processor is further configured to:
 transmit the first IoT device profile data to a device that enforces the at least one access control rule.

6. The system of claim 1, wherein the hardware processor is further configured to:
 generate at least one other access control rule; and
 publish second IoT device profile data in a second new block of the blockchain,
 wherein the second IoT device profile data comprises the at least one other access control rule, and
 wherein the second new block is linked to the first new block.

7. The system of claim 6, wherein the hardware processor is further configured to:
- validate a request to update the at least one access control rule based on consensus with at least one participant of the blockchain network,
- wherein the at least one other control access rule comprises at least one updated access control rule.

8. A method for sharing IoT device profile data, the method comprising:
- generating at least one access control rule to protect an IoT device;
- publishing first IoT device profile data in a first new block of a blockchain of a blockchain network, wherein the first IoT device profile data comprises the at least one access control rule; and
- committing the first new block to the blockchain based on a consensus algorithm by:
  - the security vendor committing the first new block to the blockchain based on consensus among at least the security vendor and one or more internet service providers (ISP) managing the IoT device when the security vendor and the one or more ISPs are participating in the blockchain network;
  - or
  - an ISP participating in the blockchain network committing the first new block to the blockchain based on consensus among at least the ISP and the one or more ISPs managing the IoT device when the ISP and the one or more ISPs are participating in the blockchain network.

9. The method of claim 8, wherein the at least one access control rule comprises an L3/L4 firewall rule, a Transport Layer Security firewall rule, or a privacy rule.

10. The method of claim 8, further comprising:
- signing the first IoT device profile data using a private key while having revocable authorization to act as a validating node.

11. The method of claim 8, wherein the consensus algorithm comprises using a Practical *Byzantine* Fault Tolerance protocol among at least four validating nodes of the blockchain network to reach consensus.

12. The method of claim 8, further comprising:
- transmitting the first IoT device profile data to a device that enforces the at least one access control rule.

13. The method of claim 8, further comprising:
- generating at least one other access control rule; and
- publishing second IoT device profile data in a second new block of the blockchain,
- wherein the second IoT device profile data comprises the at least one other access control rule, and
- wherein the second new block is linked to the first new block.

14. The method of claim 13, further comprising:
- validating a request to update the at least one access control rule based on consensus with at least one participant of the blockchain network,
- wherein the at least one other control access rule comprises at least one updated access control rule.

15. A non-transitory computer-readable medium containing computer-executable instructions that, when executed by a processor, cause the processor to perform a method for sharing IoT device profile data, the method comprising:
- generating at least one access control rule to protect an IoT device;
- publishing first IoT device profile data in a first new block of a blockchain of a blockchain network, wherein the first IoT device profile data comprises the at least one access control rule; and
- committing the first new block to the blockchain based on a consensus algorithm by:
  - the security vendor committing the first new block to the blockchain based on consensus among at least the security vendor and one or more internet service providers (ISP) managing the IoT device when the security vendor and the one or more ISPs are participating in the blockchain network;
  - or
  - an ISP participating in the blockchain network committing the first new block to the blockchain based on consensus among at least the ISP and the one or more ISPs managing the IoT device when the ISP and the one or more ISPs are participating in the blockchain network.

16. The non-transitory computer-readable medium of claim 15, wherein the at least one access control rule comprises an L3/L4 firewall rule, a Transport Layer Security firewall rule, or a privacy rule.

17. The non-transitory computer-readable medium of claim 15, the method further comprising:
- signing the first IoT device profile data using a private key while having revocable authorization to act as a validating node.

18. The non-transitory computer-readable medium of claim 15, wherein the consensus algorithm comprises using a Practical *Byzantine* Fault Tolerance protocol among at least four validating nodes of the blockchain network to reach consensus.

19. The non-transitory computer-readable medium of claim 15, the method further comprising:
- transmitting the first IoT device profile data to a device that enforces the at least one access control rule.

20. The non-transitory computer-readable medium of claim 15, the method further comprising:
- generating at least one other access control rule; and
- publishing second IoT device profile data in a second new block of the blockchain,
- wherein the second IoT device profile data comprises the at least one other access control rule, and
- wherein the second new block is linked to the first new block.

21. The non-transitory computer-readable medium of claim 20, the method further comprising:
- validating a request to update the at least one access control rule based on consensus with at least one participant of the blockchain network,
- wherein the at least one other control access rule comprises at least one updated access control rule.

* * * * *